(12) United States Patent
Park et al.

(10) Patent No.: US 10,910,966 B2
(45) Date of Patent: Feb. 2, 2021

(54) VEHICLE SYSTEM, MOTOR CONTROL SYSTEM AND MOTOR CONTROL METHOD

(71) Applicants: Hyundai Motor Company, Seoul (KR); Kia Motors Corporation, Seoul (KR)

(72) Inventors: Sangjin Park, Gyeonggi-do (KR); Seung Hyun Youn, Gyeonggi-do (KR); Yeonho Kim, Gyeonggi-do (KR); Hyoungjun Cho, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/546,921

(22) Filed: Aug. 21, 2019

(65) Prior Publication Data

US 2020/0106374 A1 Apr. 2, 2020

(30) Foreign Application Priority Data

Oct. 1, 2018 (KR) .......................... 10-2018-0117039

(51) Int. Cl.
*H02P 6/12* (2006.01)
*B60L 3/00* (2019.01)
*H02P 6/24* (2006.01)
*H02P 6/28* (2016.01)
*H02P 6/16* (2016.01)

(52) U.S. Cl.
CPC .............. *H02P 6/12* (2013.01); *B60L 3/0061* (2013.01); *B60L 3/0076* (2013.01); *H02P 6/16* (2013.01); *H02P 6/24* (2013.01); *H02P 6/28* (2016.02); *H02P 2203/03* (2013.01)

(58) Field of Classification Search
CPC ...... H02P 6/12; H02P 6/16; H02P 6/24; H02P 27/04; B60L 3/0076
See application file for complete search history.

(56) References Cited

U.S. PATENT DOCUMENTS

| | | | |
|---|---|---|---|
| 4,892,014 A | 1/1990 | Morell et al. | |
| 8,876,658 B2* | 11/2014 | Kazama | B60L 58/15 477/27 |
| 9,090,177 B2* | 7/2015 | Okura | B60L 1/003 |
| 9,346,449 B1* | 5/2016 | Chang | H02P 7/00 |
| 2014/0149012 A1* | 5/2014 | Shiraki | B60T 13/741 701/70 |

(Continued)

FOREIGN PATENT DOCUMENTS

| | | |
|---|---|---|
| EP | 1845495 A1 | 10/2007 |
| FR | 2981900 A1 | 5/2013 |

(Continued)

*Primary Examiner* — Rina I Duda
(74) *Attorney, Agent, or Firm* — Mintz Levin Cohn Ferris Glovsky and Popeo, P.C.; Peter F. Corless

(57) ABSTRACT

A motor control system is provided. The system includes an inverter that adjusts a stator current applied to a stator coil of a wound-rotor drive motor and a rotor current applied to a rotor coil of the drive motor. When an abnormal starting of the drive motor is detected and a movement of the vehicle is restricted by electronic parking brakes (EPB), a motor controller adjusts the rotor current through the inverter to cancel an abnormal starting torque caused by the abnormal starting.

18 Claims, 5 Drawing Sheets

(56) References Cited

U.S. PATENT DOCUMENTS

2014/0350827 A1* 11/2014 Mukaihara .............. F02D 29/02
701/113
2015/0081182 A1* 3/2015 Li ....................... B60W 10/184
701/53
2017/0240148 A1* 8/2017 Kotera .................... F16D 65/18

FOREIGN PATENT DOCUMENTS

KR 100250300 B1 4/2000
KR 100866469 B1 10/2008

* cited by examiner

VEHICLE SYSTEM, MOTOR CONTROL SYSTEM AND MOTOR CONTROL METHOD

CROSS-REFERENCE TO RELATED APPLICATION

This application claims priority to and the benefit of Korean Patent Application No. 10-2018-0117039 filed on Oct. 1, 2018, the entire contents of which are incorporated herein by reference.

BACKGROUND

(a) Field of the Invention

The present invention relates to a vehicle system, motor control system and motor control system, and more particularly, to a vehicle system, motor control system and motor control method capable of restricting a movement of an electric vehicle caused by an abnormal operation of a drive motor of the vehicle, even if the vehicle has a reduction gear without a parking structure.

(b) Description of the Related Art

An electronic parking brake (EPB) is a parking brake apparatus controlled electronically, unlike wire control of the prior art. When the vehicle is stopped, the EPB automatically maintains a locked state, and when the vehicle starts, the EPB automatically unlocks based on an accelerator pedal operation. In recent cases, parking structures are being removed from a reduction gear of electric vehicles to reduce cost, and the parking/stopping function of the electric vehicles are realized by EPB only.

However, in the above-described cases, the EPB may be unable to prevent sudden unindicted acceleration caused by a malfunction of the drive motor that supplies driving power to the electric vehicle. Therefore, there is a need for a fail-safe function for preventing this kind of problem.

The above information disclosed in this section is merely for enhancement of understanding of the background of the invention and therefore it may contain information that does not form the prior art that is already known in this country to a person of ordinary skill in the art.

SUMMARY

The present invention has been made in an effort to provide a vehicle system, motor control system and motor control method capable of restricting a movement of an electric vehicle caused by an abnormal operation of a drive motor of the vehicle, even if the vehicle has a reduction gear without a parking structure.

A motor control system according to an exemplary embodiment of the present invention may include an inverter configured to adjust a stator current applied to a stator coil of an wound-rotor drive motor and a rotor current applied to a rotor coil of the drive motor; and a motor control system configured to, when an abnormal starting of the drive motor is detected and a movement of the vehicle is restricted by electronic parking brakes (EPB), adjust the rotor current through the inverter to cancel an abnormal starting torque caused by the abnormal starting.

The motor controller may be configured to detect the abnormal starting by monitoring a torque of the drive motor. In addition, the motor controller may be configured to detect the abnormal starting by monitoring a current of the drive motor. When the abnormal staring is detected, the motor controller may be configured to detect the abnormal starting torque by sensing a position of the rotor. When the abnormal starting is detected the rotor current may be adjusted to generate a cancelling torque in a direction for cancelling the abnormal starting torque. In particular, the cancelling of torque may be limited to less than a fastening torque of the EPB.

In addition, a vehicle system according to an exemplary embodiment of the present invention may include electronic parking brakes (EPB) coupled to driving wheels and configured to adjust a parking status of a vehicle, a wound-rotor drive motor configured to supply a driving power to the vehicle, and a motor control system configured to, when an abnormal starting of the drive motor is detected and a movement of the vehicle is restricted by the EPB, adjust a rotor current applied to a rotor coil of the drive motor cancel an abnormal starting torque caused by the abnormal starting.

The motor control system may be configured to detect the abnormal starting by monitoring a torque of the drive motor, and monitoring a current of the drive motor. When the abnormal staring is detected the motor controller may be configured to detect the abnormal starting torque by sensing a position of a rotor of the drive motor. Additionally, when the abnormal starting is detected, the motor controller may be configured to adjust the rotor current to generate a cancelling torque in a direction for cancelling the abnormal starting torque. The cancelling torque is limited to less than a fastening torque of the EPB.

Further, a motor control method of a vehicle including a wound-rotor drive motor and electronic parking brakes (EPB), the method may include detecting an abnormal starting of the drive motor when a movement of the vehicle is restricted by the EPB; when the abnormal starting is detected, detecting an abnormal starting torque caused by the abnormal starting; and generating a cancelling torque for cancelling the abnormal starting torque, by adjusting a rotor current applied to a rotor coil of the drive motor.

The abnormal starting of the drive motor may be detected by monitoring a torque of the drive motor. Additionally, the abnormal starting of the drive motor may be detected by monitoring a current of the drive motor. The detecting of the abnormal starting torque may include detecting the abnormal starting torque by sensing a position of the rotor. According to an exemplary embodiment of the present invention, even for an electric vehicle having a reduction gear without a parking structure, a movement of the vehicle caused by an abnormal operation of a drive motor of the vehicle may be restricted.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Figure 1:
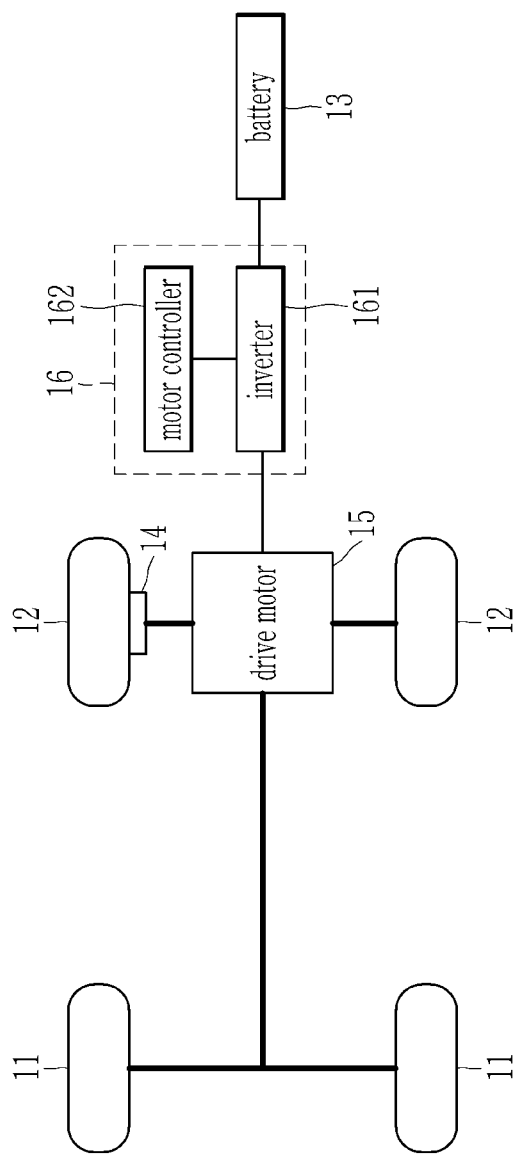
FIG. 1 schematically illustrates a vehicle system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention will be described more fully hereinafter with reference to the accompanying drawings, in which exemplary embodiments of the invention are shown. The size and the thickness of each component illustrated in the drawings are arbitrarily illustrated in the drawings for better understanding and ease of description, but the present invention is not limited to the illustration. In the drawings, the thicknesses of various portions and regions are enlarged for clarity.

As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification. In the following description, dividing names of components into first, second and the like is to divide the names because the names of the components are the same as each other and an order thereof is not particularly limited.

Figure 2:
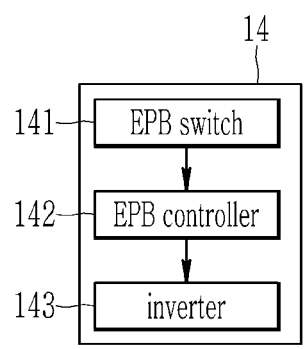
FIG. 2 schematically illustrates an electronic parking brake according to an exemplary embodiment of the present invention.
Figure 3:
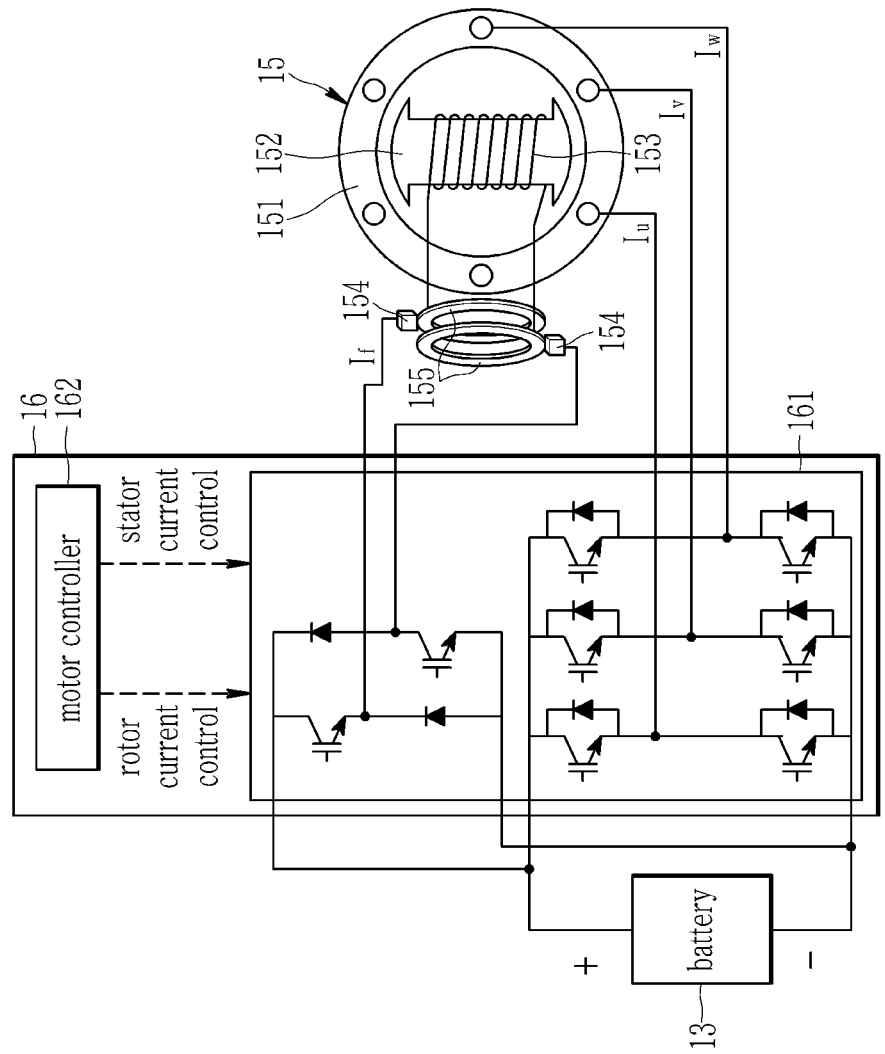
FIG. 3 schematically illustrates a motor control system according to an exemplary embodiment of the present invention.
Figure 4:
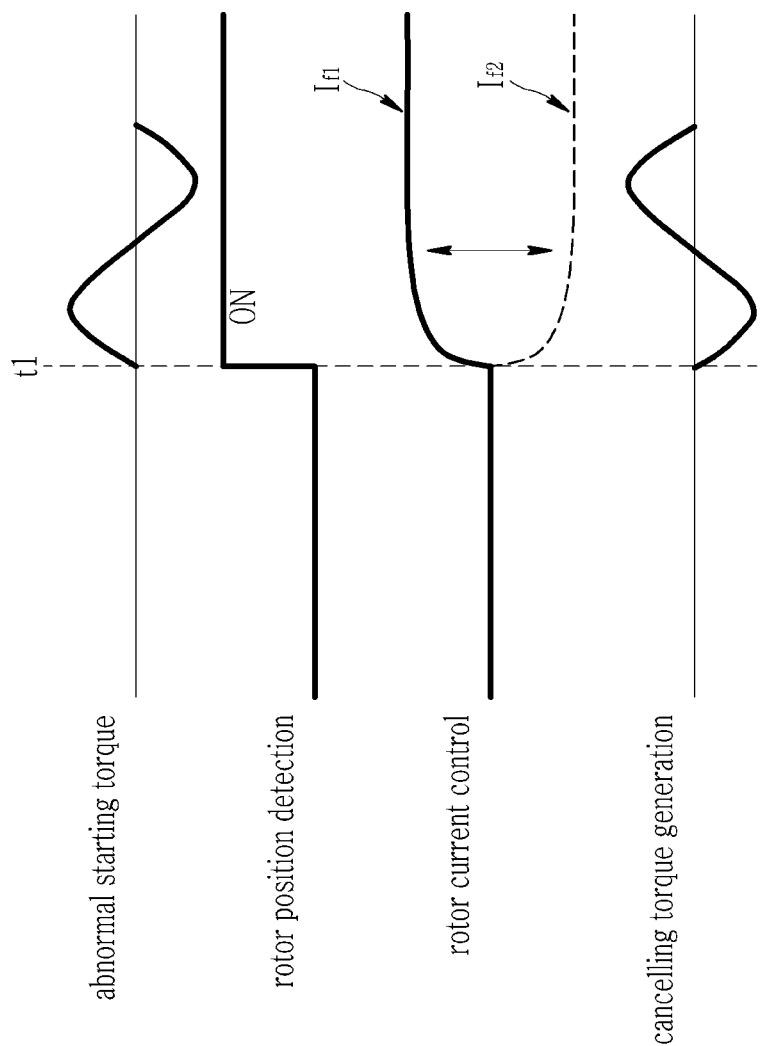
FIG. 4 illustrates a method to cancel an abnormal torque of a motor by adjusting a rotor current according to an exemplary embodiment of the present invention.

FIG. 1 schematically illustrates a vehicle system according to an exemplary embodiment of the present invention, more particularly, an electric vehicle system driven by a motor. FIG. 2 schematically illustrates an electronic parking brake (EPB) according to an exemplary embodiment of the present invention, and FIG. 3 schematically illustrates a motor control system according to an exemplary embodiment of the present invention. FIG. 4 illustrates a method to cancel an abnormal torque of a motor by adjusting a rotor current according to an exemplary embodiment of the present invention.

Referring to FIG. 1, a vehicle system according to an exemplary embodiment of the present invention may include driving wheels 11 and 12, a battery 13, an electronic parking brake (EPB) 14, drive motor 15 and a motor control system 16. The EPB 14 may be coupled to inside of the driving wheel and adjust a parking status of the vehicle.

Referring to FIG. 2, the EPB 14 may include an EPB switch 141, an EPB controller 142 and a brake unit 143. The EPB switch 141 may be configured to output a parking signal to the EPB controller 142 based on a driver manipulation, such as engaging a separate parking button, or in another predetermined stopping condition. In other words, the EPB switch 141 may be configured to output the parking signal based on driving information such as a vehicle speed or whether the brake is operated.

Thereafter, the EPB switch 141 may be configured to output or transmit a parking release signal to the EPB controller 142 based on an acceleration condition in which an accelerator pedal is operated or engaged. The EPB controller 142 may be configured to execute operation of the brake unit 143 based on a control signal input from the EPB switch 141. In other words, when the parking signal is input from the EPB 141, the EPB controller 142 may be configured to restrict a movement of the vehicle by operating the brake unit 143 mounted inside the driving wheel 12. Thereafter, when the parking release signal is input from the EPB 141, the EPB controller 142 may be configured to release the parking status of the vehicle by operating the brake unit 143 mounted inside the driving wheel 12.

The brake unit 143 may be coupled to the driving wheel and may be configured to adjust the driving wheel to be in parking status. The EPB 14 of may be controlled electronically, unlike wire control of the prior art. Additionally, the EPB 14 may be coupled to at least one pair of front wheels 11 or rear wheels 12. For example, as shown in FIG. 1, the EPB 14 may be coupled to rear wheels 12 in a rear-wheel drive vehicle.

Referring to FIG. 1 again, the drive motor 15 may be configured to supply a driving torque to the vehicle with an electrical energy supplied from the battery 15. According to an exemplary embodiment of the present invention, the drive motor 15 may be a Wound Rotor Synchronous Motor, (WRSM). Referring to FIG. 3, the WRSM 15 may include a stator 151, a rotor core, 152, a rotor coil 153, a brush and a slip ring 155. A stator coil (not shown) may be wound in the stator 151, and the a rotor (not shown) may be rotatably installed at a predetermined air gap at the inside of the stator 151. A rotational shaft (not shown) may be coupled in a central portion of the rotor, and the rotor core 152 may be disposed at the body of the rotor. The rotor coil 153 may be wound in the rotor core 152.

Further, the brush 154 may be configured to apply a direct current (DC) supplied from an inverter 161 to the rotor coil 153 via the slip ring 155. The slip ring 155 may be fixedly installed at the one end portion and may be electrically connected to both ends of the rotor coil 153. The slip ring 155 may be configured to transmit the DC current supplied through the brush 154 to the rotor coil 153. In a WRSM having the aforementioned structure, coil may be wound in a stator and also in a rotor core. Therefore, operation of a drive motor may be adjusted by varying a stator current ($I_g$, $I_v$, $I_w$) applied to a stator coil and a rotor current ($I_f$) applied to a rotor coil.

Referring to FIGS. 1 and 3, a motor control system 16 according to an exemplary embodiment of the present invention may include an inverter 161 and a motor controller 162. An inverter 161 may be configured receive an electrical energy from a battery 13 and adjust a stator current ($I_g$, $I_v$, $I_w$) and a rotor current ($I_f$) which are output to a stator coil (not shown) and a rotor coil 153 of a drive motor 15 based on a control signal applied from a motor controller 162. The motor controller 162 may be configured to adjust the stator current ($I_g$, $I_v$, $I_w$) and the rotor current ($I_f$) which are output through the inverter 161 to execute operation of the drive motor 15.

According to an exemplary embodiment of the present invention, in a parking/stopping mode (EPB ON) in which vehicle's movement is restricted, a motor controller 162 may be configured to monitor an abnormal current inflow of a drive motor 15. In particular, the motor controller 162 may be configured to receive a notification regarding the vehicle's entrance to the parking/stopping mode (EPB ON) from the EPB controller 142 or a vehicle controller (not shown). The motor controller 162 may also be configured to determine whether an abnormal current flows into the drive motor 15 by monitoring a current applied to a stator coil or a rotor coil of the drive motor 15. Notably, an abnormal current refers to all currents other than current inflow for normal motor driving (e.g., current due to a short of a battery, sensor malfunction, driver error, static electricity, programming error, or the like). In addition, the motor controller 162 may also be configured to determine whether an abnormal current flows into the drive motor 15 by monitoring a torque of the drive motor 15.

Referring to FIG. 4, when an abnormal current flows into a drive motor 15 (after time t1 in graph) in a parking/stopping mode, the drive motor 15 may perform abnormal starting. Accordingly, the motor controller 162 may be configured to detect a starting torque in the parking/stopping mode (EPB ON), and determine an abnormal current inflow into the drive motor 15 to have occurred when an abnormal starting torque is generated. When the abnormal current inflow into the drive motor 15 is detected in the parking/stopping mode (EPB ON), the motor controller 162 may be configured to adjust a rotor current ($I_f$) using an inverter 161 to cancel an abnormal starting torque of the drive motor 15 caused by the abnormal current inflow.

Referring to FIG. 4, when a drive motor 15 starts abnormally due to an abnormal current ($I_{f1}$) flowing into the drive motor 15 in a parking/stopping mode (EPB ON), a motor controller 162 may be configured to measure an abnormal starting torque by activating a rotor position sensing. In particular, the rotor position may be sensed using a sensor and the position may be transmitted to the motor controller. Thereafter, the motor controller may be configured to apply a cancelling current ($I_{f2}$) to a rotor of the drive motor 15 to generate a cancelling torque for cancelling the measured abnormal starting torque. The cancelling torque may be limited to less than fastening torque of the brake unit 143 of the EPB 14.

FIG. 1 illustrates, as an example, that the vehicle is a two-wheel-drive (2WD) vehicle. However, it should be understood that the present invention is not necessarily limited thereto. More particularly, the present invention may be applied to four-wheel-drive (4WD) vehicle, in which a drive motor is coupled to rear wheels and front wheels to supply driving power. A Wound Rotor Synchronous Motor (WRSM) as a drive motor and a pair of electronic parking brake (EPB) may be coupled to any one pair of front wheels or rear wheels, and Permanent Magnet Synchronous Motor (PMSM) or an induction motor may be coupled to the other pair of wheels as a drive motor.

A motor controller of the above-described vehicle system may be respectively implemented by one or more processors operated by a predetermined program, and the predetermined program may include a series of commands for performing a method according to an exemplary embodiment of the present invention described later.

Figure 5:
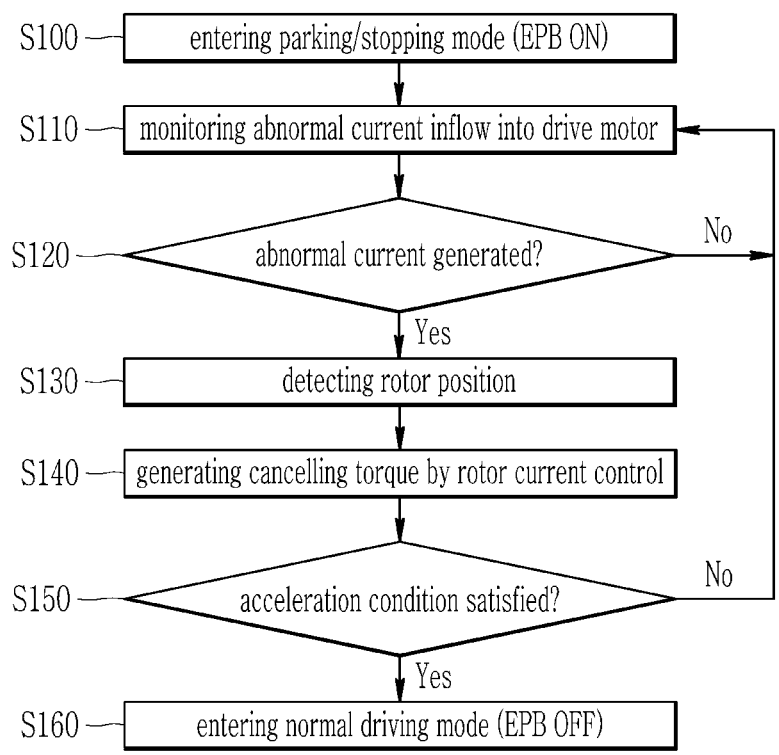
FIG. 5 schematically illustrates a motor control method of a motor control system of an exemplary embodiment of the present invention.

FIG. 5 schematically illustrates a motor control method of a motor control system 16 of an exemplary embodiment of the present invention. The motor control method illustrated in FIG. 5 may be performed by the motor controller 162 described referring to FIG. 1. Referring to FIG. 5, when a vehicle enters a parking/stopping mode (EPB ON), a motor control system 16 according to an exemplary embodiment of the present invention may be configured to monitor an abnormal current inflow into a drive motor 15 at step S100.

At the step S100, the motor controller 162 of the motor control system 16 may be configured to receive a notification regarding the vehicle's entrance to the parking/stopping mode (EPB ON) from the EPB controller 142 or a vehicle controller (not shown). In other words, the EPB controller 142 or the vehicle controller may be configured to detect a parking/stopping mode and transmit a related signal to the motor controller 162. At the step S100, the motor control system 16 may also be configured to determine whether an abnormal current has flowed into the drive motor 15 by monitoring the current applied to a stator coil or a rotor coil of the drive motor 15. In the step S100, the motor control system 16 may also be configured to determine whether an abnormal current has flowed into the drive motor 15 by monitoring a torque of the drive motor 15.

When the abnormal current inflow into the drive motor occurs in the step S100 at step S120, the motor control system 16 may be configured to measure an abnormal starting torque at step S130 by activating rotor position sensing. In addition, the motor control system 16 may be configured to apply a cancelling current $I_{f2}$ to the rotor of the drive motor 15, so that a cancelling torque which cancels the abnormal starting torque at step S140. Thereafter, the motor control system 16 may continuously perform the steps from S110 to S140, until the vehicle satisfies an acceleration condition at step S150 and enters a normal driving mode at step S160. The acceleration condition may be considered an engagement of the accelerator pedal based on user input.

According to the above described exemplary embodiment of the present invention, even when a parking structure is omitted from a decelerator, an abnormal starting of a drive motor caused by an abnormal current inflow may be prevented only by rotor current control of the drive motor and an EPB. Accordingly, the motor control system may provide a fail-safe function and secure the safety of the vehicle.

The computer-readable recording medium may include any type of recording medium storing data that can be read by the computer system. Examples of the computer-readable recording device include ROM, RAM, CD-ROM, DVD_ROM, DVD_RAM, magnetic tape, floppy disk, hard disk, optical data storage, and the like. In addition, the computer-readable recording medium may be distributed to network-connected computer devices so that computer-readable codes may be stored and executed in a distributed manner.

The illustrated drawings and the disclosed detailed description of the present invention are intended to be illustrative and used for the purpose of merely describing the present invention, not limiting the meaning or the scope of the present invention which is included in the appended claims. Thus, those skilled in the art may easily select and substitute the exemplary embodiment. In addition, those skilled in the art may omit some of the constituent elements described in the present specification without degrading performance, or may add constituent elements for improving performance. Furthermore, those skilled in the art may change the sequence of the steps of the method described in the present specification in accordance with a process environment or equipment. Accordingly, the scope of the present invention should be determined based on the claims and equivalents thereof instead of the described exemplary embodiment.

DESCRIPTION OF SYMBOLS 11, 12: driving wheel
13: battery
14: electronic parking brake
141: EPB switch
142: EPB controller
143: brake unit
15: drive motor
151: stator
152: rotor core
153: rotor coil
154: brush
155: slip ring
16: motor control system
161: inverter
162: motor controller While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

What is claimed is:

1. A motor control system configured to operate a motor of a vehicle, comprising:
    an inverter configured to adjust a stator current applied to a stator coil of a wound-rotor drive motor and a rotor current applied to a rotor coil of the drive motor; and
    a motor controller configured to, when an abnormal starting of the drive motor is detected and a movement of the vehicle is restricted by electronic parking brakes (EPB), adjust the rotor current through the inverter to cancel an abnormal starting torque caused by the abnormal starting.

2. The system of claim 1, wherein the motor controller is configured to detect the abnormal starting by monitoring a torque of the drive motor.

3. The system of claim 1, wherein the motor controller is configured to detect the abnormal starting by monitoring a current of the drive motor.

4. The system of claim 1, wherein when the abnormal starting is detected, the motor controller is configured to detect the abnormal starting torque by sensing a position of the rotor.

5. The system of claim 4, wherein when the abnormal starting is detected, the motor controller is configured to adjust the rotor current to generate a cancelling torque in a direction for cancelling the abnormal starting torque.

6. The system of claim 4, wherein the cancelling torque is limited to less than a fastening torque of the EPB.

7. A vehicle system, comprising:
    electronic parking brakes (EPB) coupled to driving wheels and configured to adjust a parking status of a vehicle;
    a wound-rotor drive motor configured to supply a driving power to the vehicle; and
    a motor control system configured to, when an abnormal starting of the drive motor is detected and a movement of the vehicle is restricted by the EPB, adjust a rotor current applied to a rotor coil of the drive motor to cancel an abnormal starting torque caused by the abnormal starting.

8. The system of claim 7, wherein the motor control system is configured to detect the abnormal starting by monitoring a torque of the drive motor.

9. The system of claim 7, wherein the motor control system is configured to detect the abnormal starting by monitoring a current of the drive motor.

10. The system of claim 7, wherein when the abnormal staring is detected, the motor controller is configured to detect the abnormal starting torque by sensing a position of a rotor of the drive motor.

11. The system of claim 10, wherein when the abnormal starting is detected, the motor controller is configured to adjust the rotor current to generate a cancelling torque in a direction for cancelling the abnormal starting torque.

12. The system of claim 7, wherein the cancelling torque is limited to less than a fastening torque of the EPB.

13. A motor control method of a vehicle comprising a wound-rotor drive motor and electronic parking brakes (EPB), the method comprising:
    detecting, by a controller, an abnormal starting of the drive motor when a movement of the vehicle is restricted by the EPB;
    in response to detecting an abnormal starting, detecting, by the controller, an abnormal starting torque caused by the abnormal starting; and
    generating, by the controller, a cancelling torque for cancelling the abnormal starting torque, by adjusting a rotor current applied to a rotor coil of the drive motor.

14. The method of claim 13, wherein the detecting the abnormal starting of the drive motor includes:
    detecting, by the controller, the abnormal starting by monitoring a torque of the drive motor.

15. The method of claim 13, wherein the detecting the abnormal starting of the drive motor includes:
    detecting, by the controller, the abnormal starting by monitoring a current of the drive motor.

16. The method of claim 13, wherein the detecting the abnormal starting torque includes:
    detecting, by the controller, the abnormal starting torque by sensing a position of the rotor.

17. The method of claim 13, wherein the cancelling torque is limited to less than a fastening torque of the EPB.

18. A non-transitory computer readable medium containing program instructions executed by a controller to operate a vehicle having a wound-rotor drive motor and electronic parking brakes (EPB), the non-transitory computer readable medium comprising:
- program instructions that detect an abnormal starting of the drive motor when a movement of the vehicle is restricted by the EPB;
- in response to detecting an abnormal starting, program instructions that detect an abnormal starting torque caused by the abnormal starting; and
- program instructions that generate a cancelling torque for cancelling the abnormal starting torque, by adjusting a rotor current applied to a rotor coil of the drive motor.

* * * * *